(12) United States Patent
Wallin et al.

(10) Patent No.: US 10,916,013 B2
(45) Date of Patent: Feb. 9, 2021

(54) METHOD OF SEGMENTATION AND ANNOTATION OF IMAGES

(71) Applicant: Volvo Car Corporation, Gothenburg (SE)

(72) Inventors: Andreas Wallin, Billdal (SE); Sohini Roy Chowdhury, Santa Clara, CA (US)

(73) Assignee: Volvo Car Corporation, Gothenburg (SE)

( * ) Notice: Subject to any disclaimer, the term of this patent is extended or adjusted under 35 U.S.C. 154(b) by 85 days.

(21) Appl. No.: 16/264,776

(22) Filed: Feb. 1, 2019

(65) Prior Publication Data

US 2019/0287252 A1 Sep. 19, 2019

(30) Foreign Application Priority Data

Mar. 14, 2018 (EP) ..................................... 18161642

(51) Int. Cl.
*G06K 9/20* (2006.01)
*G06T 7/11* (2017.01)
(Continued)

(52) U.S. Cl.
CPC .............. *G06T 7/11* (2017.01); *G06K 9/6218* (2013.01); *G06T 5/002* (2013.01); *G06T 5/003* (2013.01);
(Continued)

(58) Field of Classification Search
CPC ... G06T 7/11; G06T 7/12; G06T 7/194; G06T 5/002; G06T 5/003; G06T 5/20;
(Continued)

(56) References Cited

U.S. PATENT DOCUMENTS 6,421,463 B1 * 7/2002 Poggio ............... G06K 9/00228
382/224
6,597,410 B1 * 7/2003 Doany ..................... H04N 5/74
345/157

(Continued)

FOREIGN PATENT DOCUMENTS

CN 102142089 A 8/2011
CN 102436583 A 5/2012
(Continued)

OTHER PUBLICATIONS

Achanta, Radhakrishna, et al. "SLIC superpixels compared to state-of-the-art superpixel methods." IEEE transactions on pattern analysis and machine intelligence 34.11 (2012): 2274-2282.
(Continued)

*Primary Examiner* — Gregory M Desire
(74) *Attorney, Agent, or Firm* — Clements Bernard Walker; Christopher L. Bernard

(57) ABSTRACT

There is provided a method for image segmentation and annotation. The method comprises: providing an image; reducing the image size and smoothing the image to perform low-pass filtering on the image; restoring the image size; performing pixel level clustering of the image; performing spatial clustering of the image; selecting one or more clusters corresponding to a region of interest, ROI, based on a predetermined image mask, wherein the predetermined image mask has a known location in relation to the ROI; defining the selected one or more clusters as a proposed ROI; and determining if the proposed ROI sufficiently corresponds to an actual ROI.

14 Claims, 7 Drawing Sheets

204

(51) Int. Cl.
*G06K 9/62* (2006.01)
*G06T 5/00* (2006.01)
*G06T 5/20* (2006.01)
*G06T 7/12* (2017.01)
*G06T 7/194* (2017.01)

(52) U.S. Cl.
CPC ............... *G06T 5/20* (2013.01); *G06T 7/12* (2017.01); *G06T 7/194* (2017.01); *G06T 2207/20016* (2013.01); *G06T 2207/20028* (2013.01); *G06T 2207/20081* (2013.01); *G06T 2207/20104* (2013.01); *G06T 2207/20192* (2013.01); *G06T 2207/30252* (2013.01)

(58) Field of Classification Search
CPC . G06T 2207/20016; G06T 2207/20028; G06T 2207/20081; G06T 2207/20104; G06T 2207/20192; G06T 2207/30252; G06K 9/6218
See application file for complete search history.

(56) References Cited

U.S. PATENT DOCUMENTS

| | | | | |
|---|---|---|---|---|
| 6,728,401 | B1* | 4/2004 | Hardeberg | G06K 9/0061 348/370 |
| 8,824,797 | B2* | 9/2014 | Salamati | G06T 7/162 382/173 |
| 8,970,701 | B2* | 3/2015 | Lao | G06K 9/00785 348/149 |
| 9,158,995 | B2* | 10/2015 | Rodriguez-Serrano | G06K 9/6217 |
| 10,176,388 | B1* | 1/2019 | Ghafarianzadeh | G06K 9/00671 |
| 10,445,928 | B2* | 10/2019 | Nehmadi | G01S 7/295 |
| 10,535,138 | B2* | 1/2020 | Pfeiffer | G05D 1/0253 |
| 10,635,927 | B2* | 4/2020 | Chen | G06T 7/11 |
| 10,663,298 | B2* | 5/2020 | Ali | G06N 20/00 |
| 2013/0342694 | A1* | 12/2013 | Friedhoff | G06K 9/00791 348/148 |
| 2014/0029855 | A1* | 1/2014 | Manako | G06K 9/00771 382/192 |
| 2015/0248579 | A1* | 9/2015 | Zhang | G06K 9/00637 382/173 |
| 2015/0294476 | A1 | 10/2015 | Tang et al. | |
| 2017/0344822 | A1 | 11/2017 | Popescu et al. | |
| 2018/0146198 | A1* | 5/2018 | Atluru | H04N 19/597 |
| 2018/0262739 | A1* | 9/2018 | Hunt | G06K 9/00825 |
| 2018/0308281 | A1* | 10/2018 | Okoyama | G06K 9/6201 |
| 2019/0217780 | A1* | 7/2019 | Yamaguchi | B60R 11/04 |

FOREIGN PATENT DOCUMENTS

| | | |
|---|---|---|
| CN | 104636761 A | 5/2015 |
| CN | 106022353 A | 10/2016 |
| GB | 2017220705 A1 | 12/2017 |

OTHER PUBLICATIONS

Kohonen, Teuvo. "The self-organizing map." Neurocomputing 21.1 (1998): 1-6.

Kovesi, Peter D. "MATLAB and Octave functions for computer vision and image processing." Centre for Exploration Targeting, School of Earth and Environment, The University of Western Australia (2000).

Aug. 10, 2018 European Search Report issue on International Application No. EP18161642.

\* cited by examiner

200

202

METHOD OF SEGMENTATION AND ANNOTATION OF IMAGES

CROSS-REFERENCE TO RELATED APPLICATION

The present patent application/patent claims the benefit of priority of co-pending European Patent Application No. 18161642.6, filed on Mar. 14, 2018, and entitled "METHOD OF SEGMENTATION AND ANNOTATION OF IMAGES," the contents of which are incorporated in full by reference herein.

FIELD OF THE INVENTION

The present invention relates to a method for annotation and segmentation of images. In particular, the present invention relates to semi-automated annotation and segmentation of images suitable to be used for training of vehicle systems.

BACKGROUND OF THE INVENTION

There is an increasing interest in the development and utilization of driver assistance systems in vehicles, such as lane keeping, braking assist, parking assist and adaptive cruise control systems. There are also concerted efforts to develop semi-autonomous and fully autonomous vehicles.

The automated driving (AD) and advanced driver-assistance systems (ADAS) required for providing the desired functionalities include technologies such as such as RADAR, LIDAR, ultrasound and image based systems.

For image based systems operating based on real-time object recognition, it is important that the systems are capable of identifying and classifying various objects surrounding the vehicle. Such systems could be relied upon to identify lane markings, road signs, a drivable road surface, other vehicles, etc.

However, in order to ensure that such image based systems operate correctly, they often need to be trained on real images where the images are annotated to define the various objects and areas of interest for the particular system, such as object detection, lane detection and drivable surface semantic segmentation.

Manually annotated data, i.e. images where a human operator has manually defined the various objects on interest can be considered to be reliable and is therefore often used. However, there are also problems related to manually annotated data. One issue is that manually annotated data is expensive in terms of the time and expertise required to segment and annotate the regions of interest. Moreover, manually annotated data is prone to demonstrate inter-observer variabilities where the annotations provided by two different operators may vary significantly, which in turn rises the need for a quality control mechanism such as an independent review process, thereby making the annotation process even more demanding.

Accordingly, there is a need for method and systems for image segmentation and annotation having increased efficiency.

SUMMARY

In view of above-mentioned and other drawbacks of the prior art, it is an object of the present invention to provide a semi-automated method for image segmentation and annotation which simplifies the image annotation process.

According to a first aspect of the invention, there is provided a method for image segmentation and annotation comprising: providing an image; reducing the image size and smoothen the image to perform low-pass filtering of the image; restoring the image size; performing pixel level clustering of the image; performing spatial clustering of the image; selecting one or more clusters corresponding to a region of interest (ROI) based on a predetermined image mask, wherein the predetermined image mask has a known location in relation to the ROI; defining the selected one or more clusters as a proposed ROI; and determining if the proposed ROI sufficiently corresponds to an actual ROI.

The images may be images acquired by a camera arranged in a vehicle or on the outside of the vehicle, where the image illustrates the vehicle surroundings. The image may thus comprise a variety of objects such as road, sky, trees, buildings, other vehicles, etc. Thereby the images are suitable for use as training images for various vehicle systems comprising cameras and object recognition to provide guidance for the vehicle. Preferably, the images can be captured by the same vehicle system for which they are to be used for training after annotation. Moreover, a plurality of images may be stored in a database prior to performing the described method of image segmentation and annotation.

Image size reduction and smoothening, i.e. low-pass filtering of the image, is performed to highlight larger substantially uniform areas in the image which may correspond to a potential ROI, while reducing the visibility of smaller areas and objects which may otherwise interfere with the ROI detection. Reducing the image size typically means shrinking an image of size, for example from 512×512 pixels to 256×256 pixels.

Next, pixel level clustering is performed where pixels having similar properties with respect to one or more pixel parameters are grouped together and defined as clusters.

Once the clustering is performed, a subset of clusters of the image is selected based on a predetermined image mask. The predetermined image mask is applied to the image and it is assumed that the predetermined image mask has a known location in relation to the sought ROI type. Taking the example where the ROI is the sky, it can be a reasonable first assumption that the upper portion of the image consists of sky. Thereby, the predetermined image mask can correspond to a top region of the image. The sky would then be located primarily below the predetermined image mask in the image. Thus, by applying a predetermined image mask having a known location in the image in relation to an assumed position of the sought ROI, a first proposal for an actual ROI can be defined. Once an approximate location of the ROI is determined, a proposal ROI can be defined by selecting the clusters appearing to encompass the sought object or region.

Finally, it is determined if the proposed ROI sufficiently corresponds to an actual ROI. Since the described method relates to semi-automated annotation of images, it is an operator (i.e. a manual annotator) which makes the final call determining if the proposed ROI is acceptable. A measure of the acceptability of the final ROI can then be determined in terms of the area overlap (IoU: intersection over union) between multiple manual annotators having annotated the same image. The annotator may also manually adjust the ROI with the help of automation tools which will be described in further detail in the following. Any such manual annotations can then be fed into deep learning models that can learn to better predict the ROIs for new incoming test images to be annotated.

By means of the described method, there is provided a semi-automated system that provides an accurate initial ROI-proposal which may be followed by a minimal number of touch-points/corrective pixels for manual correction (pixel deletion or addition). The described method can significantly enhance the throughput for annotation systems and greatly reduce the annotation costs for AD/ADAS systems.

If the proposed ROI does not sufficiently correspond to an actual ROI, further modification of the ROI is required. Various steps for further refining the ROI area in the image will be described by the following embodiments, where an operator is provided with various tools to use for modifying the ROI.

According to one embodiment of the invention, the method may further comprise applying pixel level correction to the proposed ROI by adding or removing selected pixels from the proposed ROI. Pixel level corrections are made to the proposed ROI based on image-related features such as pixel color, texture, neighborhood information etc., where pixels having selected properties may be added to or removed from the ROI.

According to one embodiment of the invention, the method may further comprise performing region level correction to the ROI by adding or removing selected clusters from the proposed ROI. Thereby, if a user points at a particular pixel location, all pixels belonging to the same cluster get selected for correction, i.e. for addition to or removal from the ROI.

According to one embodiment of the invention, the method may further comprise performing edge correction by modifying the edges of the proposed ROI. The edges of the proposed ROI can thus be moved and/or the shape of edges can be changed to provide a better match between the proposed ROI and an actual ROI as visually identified by the operator.

According to one embodiment of the invention, the edge correction may further comprise defining fiduciary edges of the ROI by connecting a plurality of fiduciary points of the image. A fiduciary edge can be defined by a plurality of fiduciary points in the image, where a fiduciary point is a pixel or group of pixels that serve as reference points or markers. If two or more fiduciary points are joined together, they represent a fiduciary edge. A fiduciary edge is constructed across pixels/edges that are automatically detected, and hence this process reduces the number of manual touch points needed for corrections.

The automatically detected fiduciary points can thus be used for quality control while segmenting large surfaces, e.g. drivable surfaces. The goal of the proposed method is to minimize manual intervention during the annotation process for large-sized objects/surfaces/regions of interest. Moreover, the resulting automatic proposals for region of interest generate baseline (repeatable, reproducible) outcomes.

According to one embodiment of the invention, fiduciary points may be identified by filtering. By applying image filters such as a Sobel filter, a Canny edge detection method and/or a high-pass filter, significant fiduciary points can be automatically highlighted in the image to further simplify edge detection and edge correction. With fiduciary points highlighted in the image, the operator may select the suitable fiduciary points to join together to for a fiduciary edge.

According to one embodiment of the invention, defining a fiduciary edge may comprise fitting a polyline to the ROI, wherein the polyline is based on a plurality of fiduciary points. A polyline is a continuous line composed of one or more line segments where each line segment here is a straight line between two fiduciary points.

According to one embodiment of the invention, performing edge correction may comprise selecting a fiduciary edge, maintaining pixels from the ROI on a selected side of the fiduciary edge and removing pixels from the ROI on the opposite side of the fiduciary edge. Thereby, an easily understandable method is provided to the operator for performing the edge correction where the selected side, defined by a direction away from the fiduciary edge, is selected by the operator. It is also possible to reverse the direction such that pixels on the selected side are removed.

According to one embodiment of the invention, smoothing may be performed by applying a bilateral filter to the image. The bilateral filter preserves sharp edges in the image but blurs the larger regions. Accordingly, the smoothing operation removes subtle distinctions in pixel values in a particular region. This increases the probability of selecting a larger proposed ROI since the visibility of minor differences in the image is reduced.

According to one embodiment of the invention, pixel level clustering may be performed using a super-pixel segmentation method or a self-organizing map method.

According to one embodiment of the invention, spatial clustering may be performed using a Density-based spatial clustering of applications with noise, DBSCAN, method. Many clustering algorithms require the number of final clusters as an input (e.g. K-means). However, while merging clusters, the final number of clusters cannot be known in advance. Hence density-based clustering algorithms such as DBSCAN are useful since they do not require the number of final clusters as an input. Accordingly, any distance-based thresholding methods (such as self-organizing maps, SOM) for spatial clustering can be used in the described application.

There is also provided a computer program comprising program code means for performing the steps of any of the aforementioned embodiments when the program is run on a computer, and a computer readable medium carrying a computer program comprising program code means for performing the above described steps when the program product is run on a computer.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the method according to the present invention are mainly described with reference to a method for segmentation and annotation of an image where the drivable surface is the region of interest (ROI). The described method can of course be used also for detection and annotation of other types of regions and objects.

Figure 1:
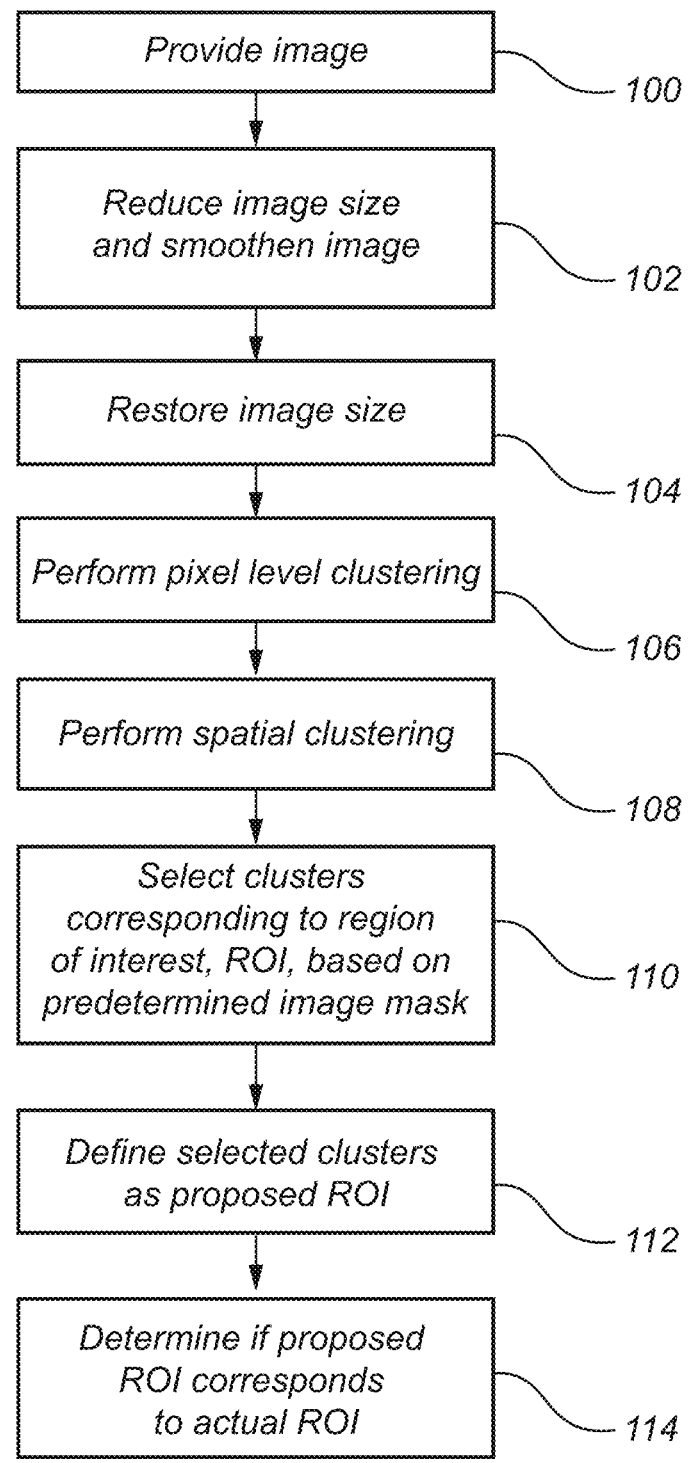
FIG. 1 is a flow chart outlining the general steps of a method according to an embodiment of the invention.

FIG. 1 is a flow chart outlining the general steps of a method according to an embodiment of the invention. The method of FIG. 1 will be described with further reference to FIGS. 2A-G schematically illustrating selected steps of the method.

Figure 2A:
FIGS. 2A-G schematically illustrate selected steps of a method according to an embodiment of the invention.

First, an image 200 is provided 100 as illustrated in FIG. 2A. The image 200 preferably represents an image 200 which is captured by a camera in a vehicle system to be trained with the resulting annotated image. Here, the image 200 is captured by a front facing camera arranged in or near the front window of the vehicle, capturing the road ahead. It is further assumed that the image 200 contains a region of interest to be identified by the described method, i.e. a region which will be relevant to detect and identify in one or more vehicle systems.

Figure 2B:

Next, the image size is reduced and the image is smoothened 102, for example by applying a bilateral filter to the image. Thereby low-pass filtering on the image is performed where the resulting smoothened image 202 is illustrated in FIG. 2B. Reducing the image size comprises reducing the number of pixels in the image, for example by a factor four. Here it can be noticed that pixels of the drivable surface (road) become very similar to one another and small objects such as lane markings disappear, thereby allowing for easier detection of the drivable surface ROI as the initial proposal.

Figure 2C:
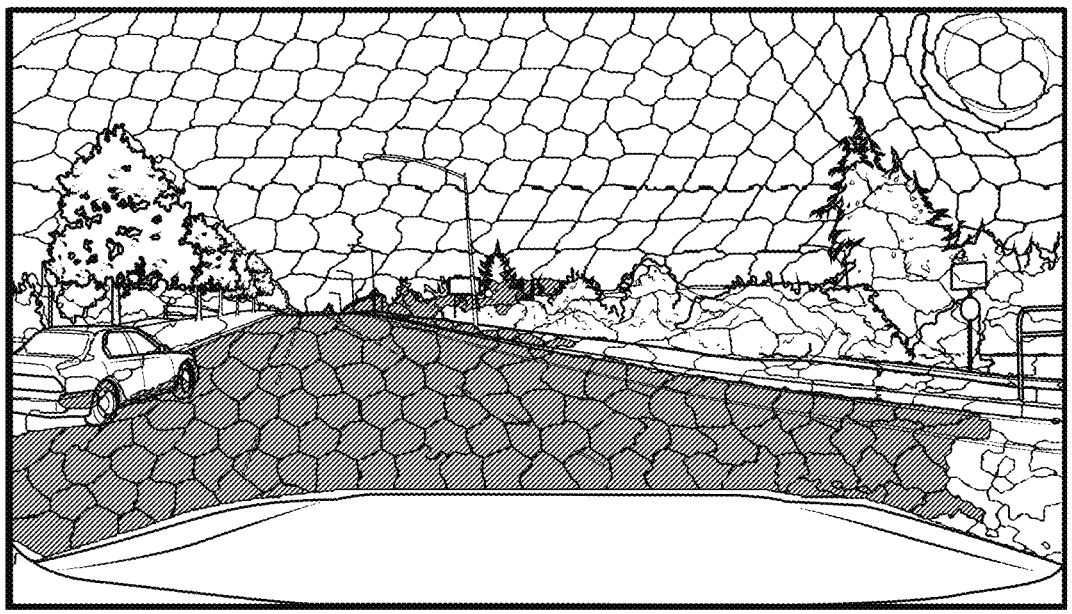

Following smoothening, the image size is restored 104 and pixel level clustering is performed 106 on the image using a super-pixel or self-organizing maps method where pixel intensity values are clustered in 3-dimensions, resulting in the image 204 illustrated in FIG. 2C.

Figure 2D:
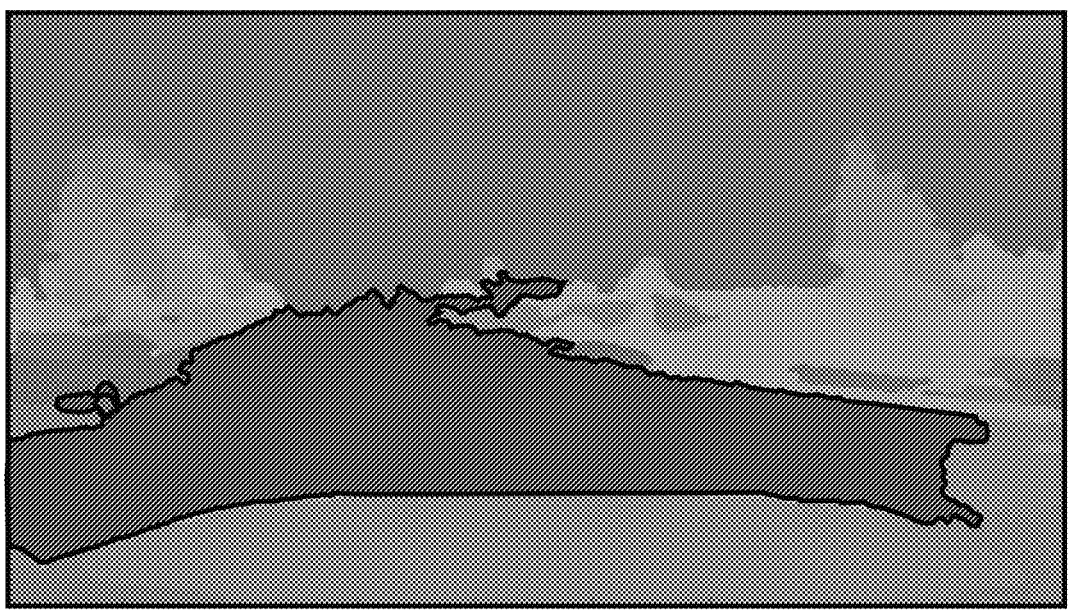
Figure 2E:
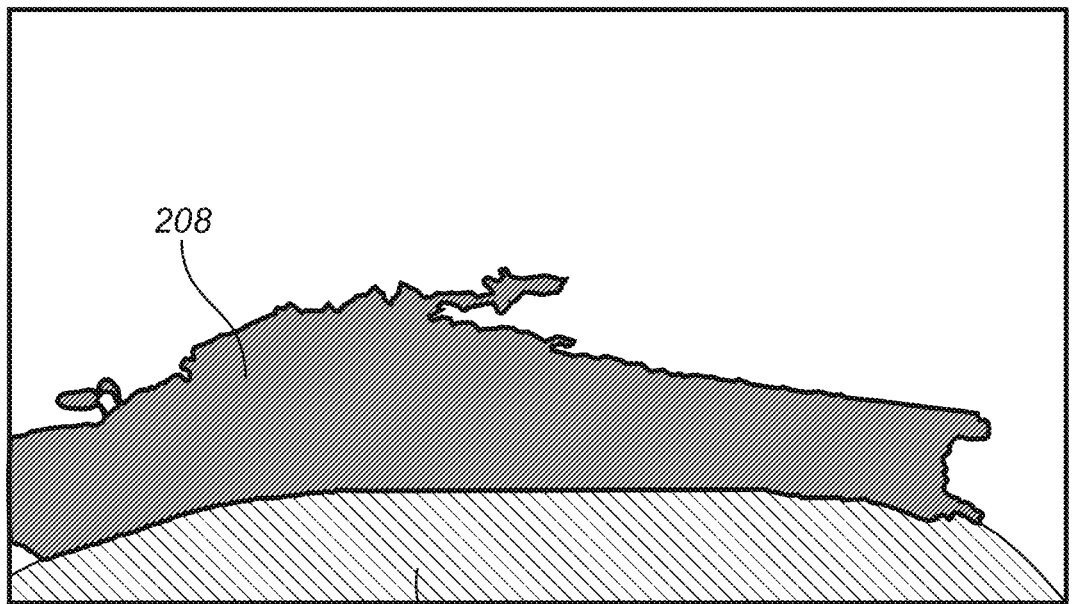
Figure 2F:
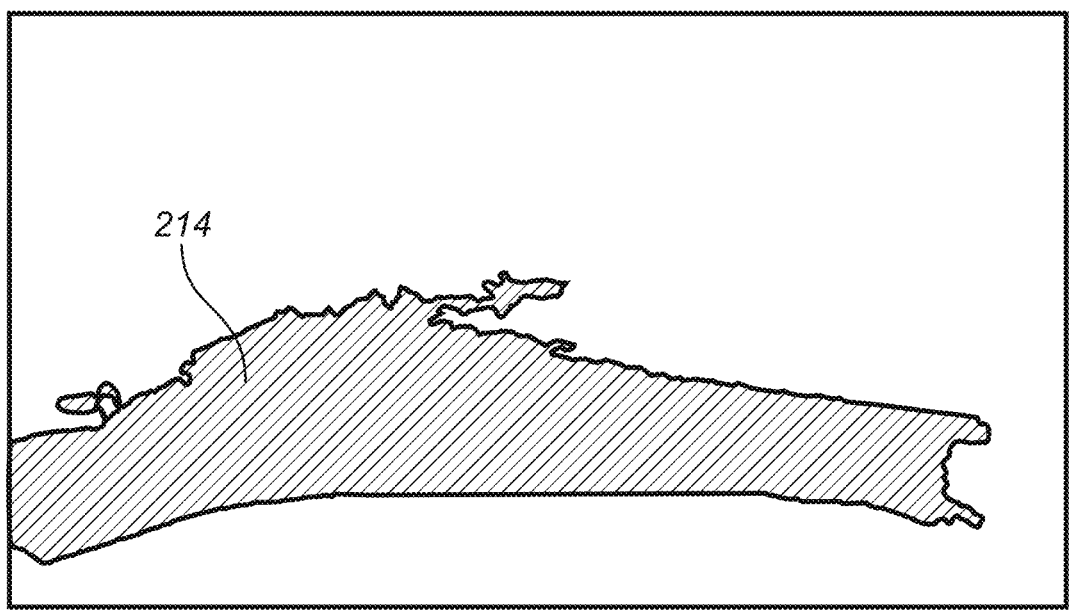

In the next step, spatial clustering of the image, i.e. spatial combination of pixel-level clusters, is performed 108 where the clusters (represented by cluster centers) are subjected to a spatial density-based spatial clustering method, such as spdbscan (Super-pixel density-based spatial clustering of applications with noise), to combine clusters with nearest cluster centers, resulting in image 206 illustrated in FIG. 2D. When the image is subjected to super-pixel-like clustering, it divides the low pass filtered image into many clusters/sub-regions.

After clustering is completed, one or more clusters corresponding to a region of interest 208 are automatically selected 110 based on a predetermined image mask 210, wherein the predetermined image mask 210 has a known location in relation to the ROI. The predetermined image mask 210 enables identification of the large ROI initial proposal region 208 among all the clusters retained in the image 206 of FIG. 2D. The resulting selected clusters 208 are illustrated in the image 212 of FIG. 2E. The selected clusters 208 are further defined 112 as a proposed ROI 214 illustrated by the image 216 in FIG. 2F. The proposed ROI 214 is thus a fully automated initial proposal of the ROI 216.

For example in the image 206 of FIG. 2D, the drivable surface would be intersecting with the hood of the car, hence the hood of the car is here used as the prior mask 210. If the intent instead would be to extract the sky as a region of interest, a prior mask corresponding to the top region of the image could be selected to identify the ROI. In principle, any prior information regarding the relative position of the object/ROI that will help separate the ROI proposal from the image can be applied as a prior mask.

The ROI proposal image 216 is in practice a binary image, where the foreground is marked by white regions (pixel value 1) and background regions by black regions (pixel value 0). Thus, the ROI proposal region 214 that is selected is defined as the foreground and all remaining pixel regions are defined as the background.

In the final step, it is determined 114 if the proposed ROI 214 sufficiently corresponds to an actual ROI. This determination is here performed by the operator by means of a visual comparison of the proposed ROI 214 with the original image where the proposed ROI 214 can be shown in the original image as illustrated by the image 218 in FIG. 2G.

Since the described method relates to an annotation application, an operator (i.e. a manual annotator) makes the final call of whether the proposed ROI is acceptable or not with the help of the described automation tools. Acceptability of the final ROI can for example be measured in terms of the area overlap (IoU: intersection over union) between multiple manual annotators. These manual annotations will then feed into deep learning models that can then predict the ROIs for new incoming test images.

Figure 2G:
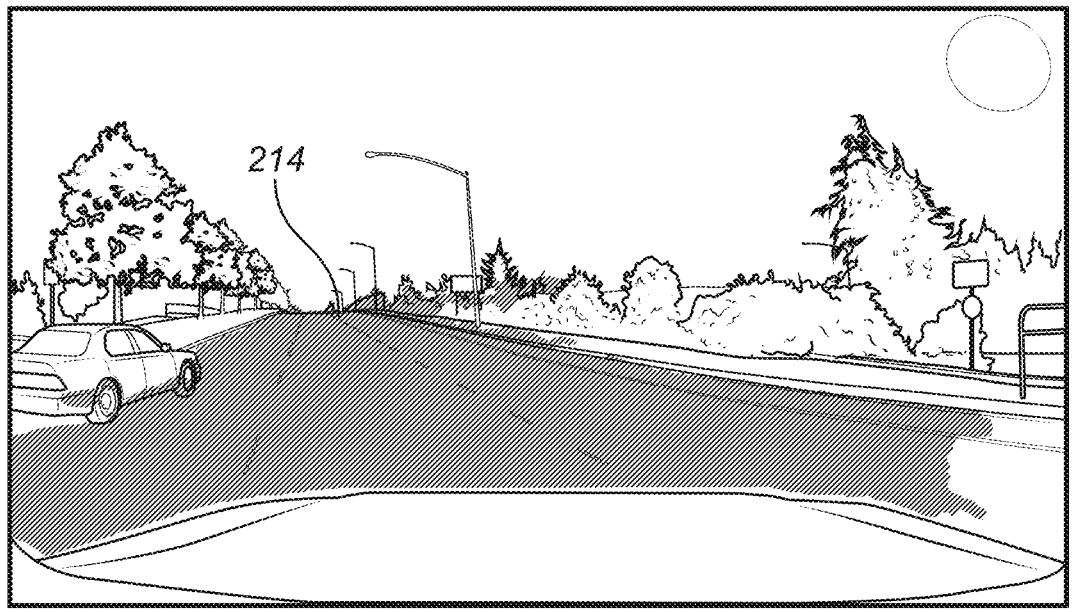

If the proposed ROI 214 is acceptable, the annotation process is completed and a new image can be processed. However, as can be seen in FIG. 2G, there are certain regions of the proposed ROI 214 which do not belong to a drivable road surface. Accordingly, further adjustment of the proposed ROI 214 may be required to achieve a sufficient correspondence between the proposed ROI 214 and the actual ROI. The required adjustments can be achieved by performing manual pixel-level corrections using one or more of the adjustment tools described in the following.

The proposed ROI 214 can for example be adjusted by adding or removing selected pixels from the proposed ROI 214 or by adding or removing selected clusters from the proposed ROI 214. Cluster based correction can be performed using the image 204 of FIG. 2C where clusters can be manually selected for addition to or removal from the proposed ROI 214.

Moreover, the proposed ROI 214 can be adjusted by performing edge correction modifying the edges of the proposed ROI 214. A method of edge correction is illustrated by FIGS. 3A-D and the general steps are outlined in the flow chart of FIG. 4.

Figures 3A, 3B, 3C, 3D:
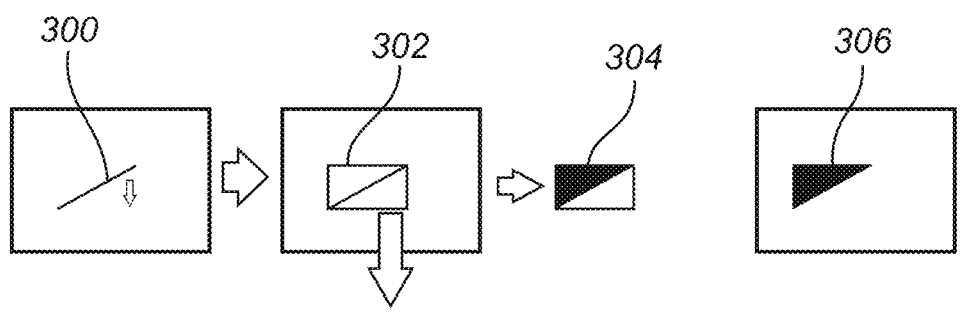
FIGS. 3A-D schematically illustrate selected steps of a method according to an embodiment of the invention.
Figure 4:
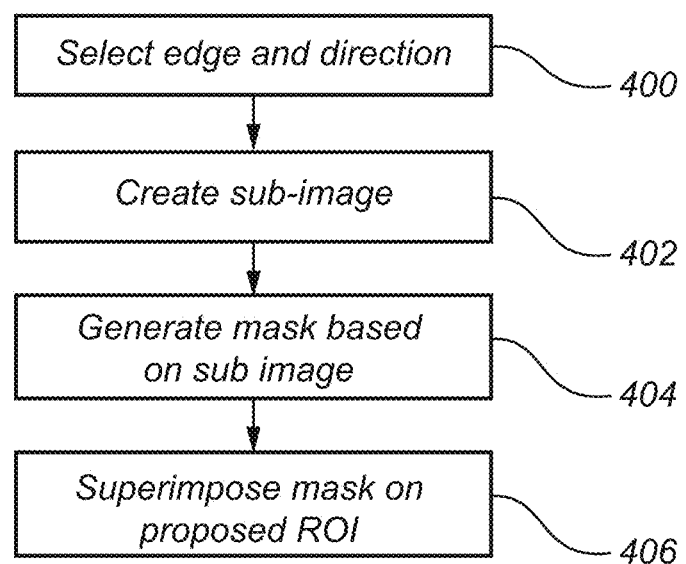
FIG. 4 is a flow chart outlining steps of a method according to an embodiment of the invention.

First, a fiduciary edge 300 to correct and a correction direction is selected 400, as illustrated in FIG. 3A. Fiduciary edges of the ROI may be defined by connecting a plurality of fiduciary points of the image, where the fiduciary points in turn can be automatically identified by filtering using a Sobel filter, a Canny edge detection method, a high-pass filter or any other suitable method.

Once a number of fiduciary points are highlighted in the image, the fiduciary points can be joined to represent a fiduciary edge 300, or a group of fiduciary points. Construction of such a fiduciary edge (an edge that contains fiduciary points) reduces errors across manual annotators for locating the road edge, for example, that is useful to mark the edge of the ROI. A fiduciary edge is constructed across pixels/edges that are automatically detected, and hence this process reduces the number of manual touch points needed for corrections.

Edge detection can be simplified by fitting a polyline joining the fiduciary points to generate the fiduciary edge 300. A polyline is defined as a "connected sequence of line segments", which would simplify detection of a fiduciary edge for a tapering road edge or an irregular, i.e. not completely straight, road edge.

An automatic polyline fit process can be used for fiduciary edge detection, for example when a long road edge is to be detected. An operator can then select a number of disconnected automatic fiduciary edges at a time by clicking at the corresponding disconnected points. A polyline fill function will then fit a line (i.e. a fiduciary edge) through the disconnected edge points. However, if the operator wishes to detect a smaller fiduciary edge, like the top of a car, or a broken lane line, then selection of one fiduciary edge only may be sufficient, which can then be used to fit a polyline to a small fiduciary edge.

If all the fiduciary points corresponding to an edge can be detected by an edge detector, such as a Canny filter, then no more polyline fitting is necessary. However, in images with varying degrees of contrast, light and shadows in various points if the image, a complete edge with all fiduciary points can be difficult to detect, and hence polyline fitting becomes an important tool for defining the edge. However, if a strong, uniformly lit edge is present in the image, all the fiduciary points may be included in a single edge, which would not need any further polyline estimation.

The construction of such a fiduciary edge reduces errors across manual annotators for locating the road edge, for example, that is useful to mark the edge of an ROI.

In order to make the edge correction process computationally fast, a backend masking approach is implemented. Accordingly, once the fiduciary edge 300 is created (automatically or manually) and selected 400, and the direction 302 for pixel preservation is chosen as illustrated in FIG. 3B, a sub-image 304 is created 402 and a binary sub-image mask 304 is generated 404 having a length and breadth to exactly fit the selected fiduciary edge 300, such that all pixels in the selected direction (here down) originating from the fiduciary edge 300 and ending at the sub-image end are given the value '1' (foreground) and all remaining pixels are given the value '0' (background). This binary sub-image mask 304 illustrated in FIG. 3C is then superimposed 406 on the ROI proposal (in the form of a pixel wise AND-operation) to achieve sharp edge-corrected ROI proposals 306 illustrated in FIG. 3D.

Figure 5A:
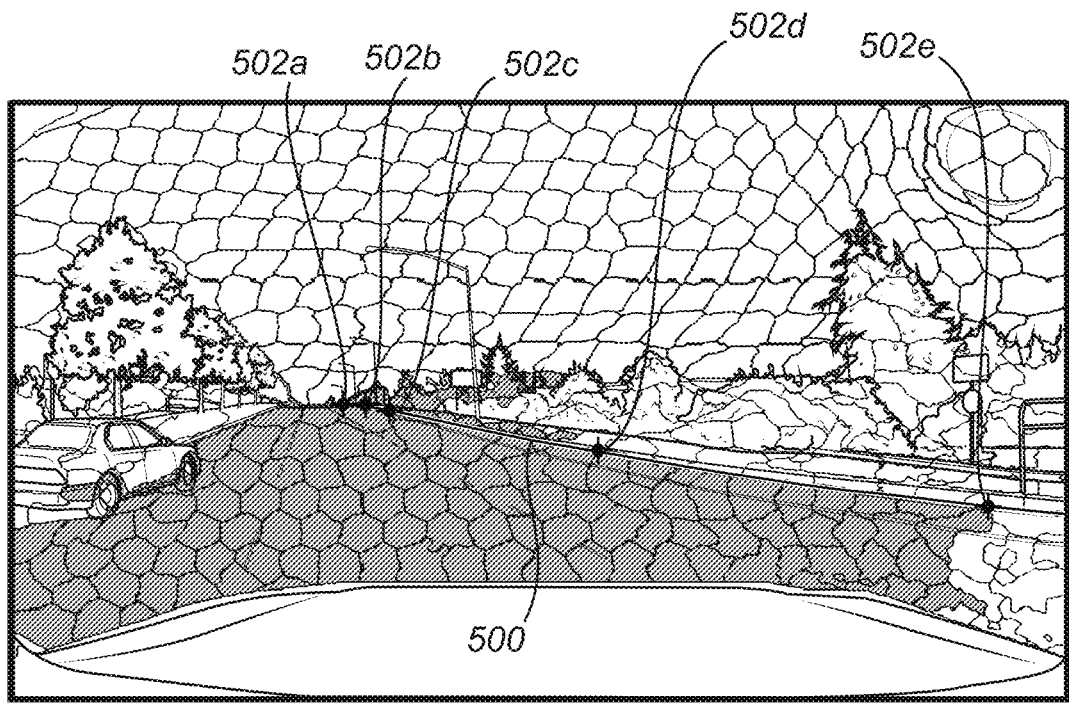
FIGS. 5A-B schematically illustrate selected steps of a method according to an embodiment of the invention.
Figure 5B:
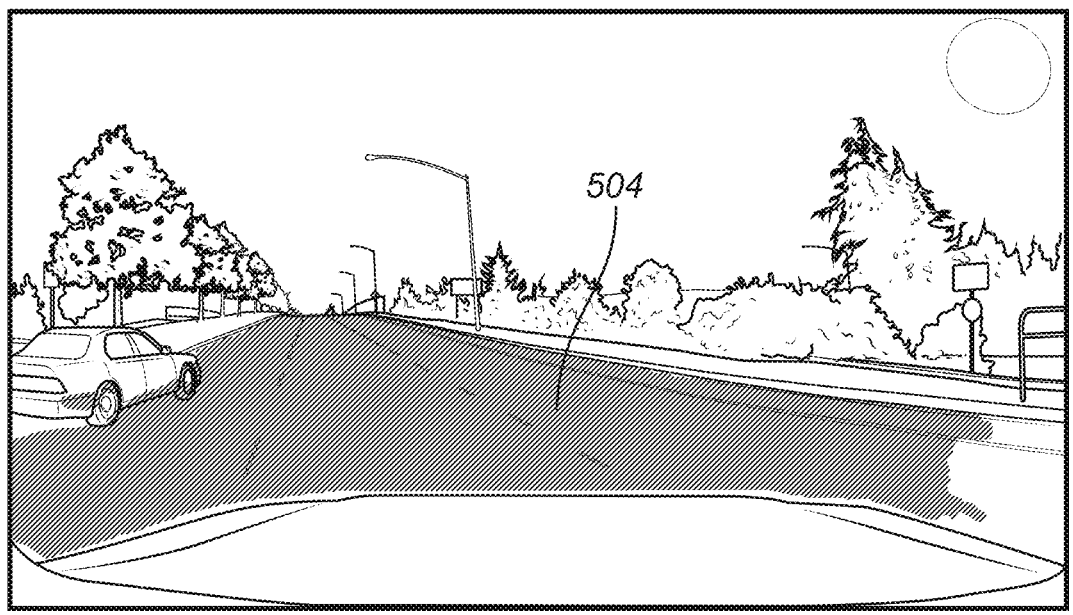

FIGS. 5A-B schematically illustrate the described edge correction method used to modify the proposed ROI 214 of the image 218 in FIG. 2G. In FIG. 5A, a fiduciary edge 500 corresponding to the road edge is defined based on a plurality of fiduciary points 502a-e. Once the fiduciary edge 500 is defined, the "down" direction is selected, meaning that the pixels above the fiduciary edge 500 are removed from the proposed ROI, and the final proposed ROI 504 after edge correction is illustrated in FIG. 5B.

Even though the proposed ROI selection method is suitable for larger ROIs such as drivable surface, sky and buildings, smaller objects may also be detected using appropriate settings of the annotation method. Also, the described approach is useful when annotating combination, i.e. non-uniform, drivable surfaces, such as road with slush and snow, water and dry patches, potholes, accumulated snow etc.

Even though the invention has been described with reference to specific exemplifying embodiments thereof, many different alterations, modifications and the like will become apparent for those skilled in the art. Also, it should be noted that parts of the method may be omitted, interchanged or arranged in various ways, the method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method of image segmentation and annotation, comprising:
   providing an image;
   reducing the image size and smoothing the image and performing low-pass filtering of the image;
   restoring the image size;
   performing pixel level clustering of the image;
   performing spatial clustering of the image;
   selecting one or more clusters corresponding to a region of interest, ROI, based on a predetermined image mask, wherein the predetermined image mask has a known location in relation to the ROI;
   defining the selected one or more clusters as a proposed ROI; and
   determining if the proposed ROI sufficiently corresponds to an actual ROI.

2. The method according to claim 1, further comprising applying pixel level correction to the proposed ROI by adding or removing selected pixels from the proposed ROI.

3. The method according to claim 1, further comprising performing region level correction to the ROI by adding or removing selected clusters from the proposed ROI.

4. The method according to claim 1, further comprising performing edge correction by modifying the edges of the proposed ROI.

5. The method according to claim 4, further comprising defining fiduciary edges of the ROI by connecting a plurality of fiduciary points of the image.

6. The method according to claim 5, wherein the fiduciary points are identified by filtering.

7. The method according to claim 6, wherein filtering is performed using a Sobel filter, a Canny edge detection method or a high-pass filter.

8. The method according to claim 6, wherein defining a fiduciary edge comprises fitting a polyline to the ROI, wherein the polyline is based on a plurality of fiduciary points.

9. The method according to claim 4, wherein performing edge correction comprises:
   selecting a fiduciary edge;
   maintaining pixels of the ROI on a selected side of the fiduciary edge; and
   removing pixels from the ROI on the opposite side of the fiduciary edge.

10. The method according to claim 1, wherein smoothing is performed by applying a bilateral filter to the image.

11. The method according to claim 1, wherein pixel level clustering is performed using a super-pixel segmentation method or a self-organizing map method.

12. The method according to claim 1, wherein spatial clustering is performed using a Density-based spatial clustering of applications with noise, DBSCAN, method.

13. A non-transitory computer readable medium stored in a memory and executed by a processor to carry out instructions performing the steps of the method according to claim 1.

14. A control unit for controlling a computer, the control unit being configured to perform the steps of the method according to claim 1.

* * * * *